Feb. 24, 1942.  J. E. PIERCE  2,274,255
FISHING LINE
Filed Aug. 12, 1940
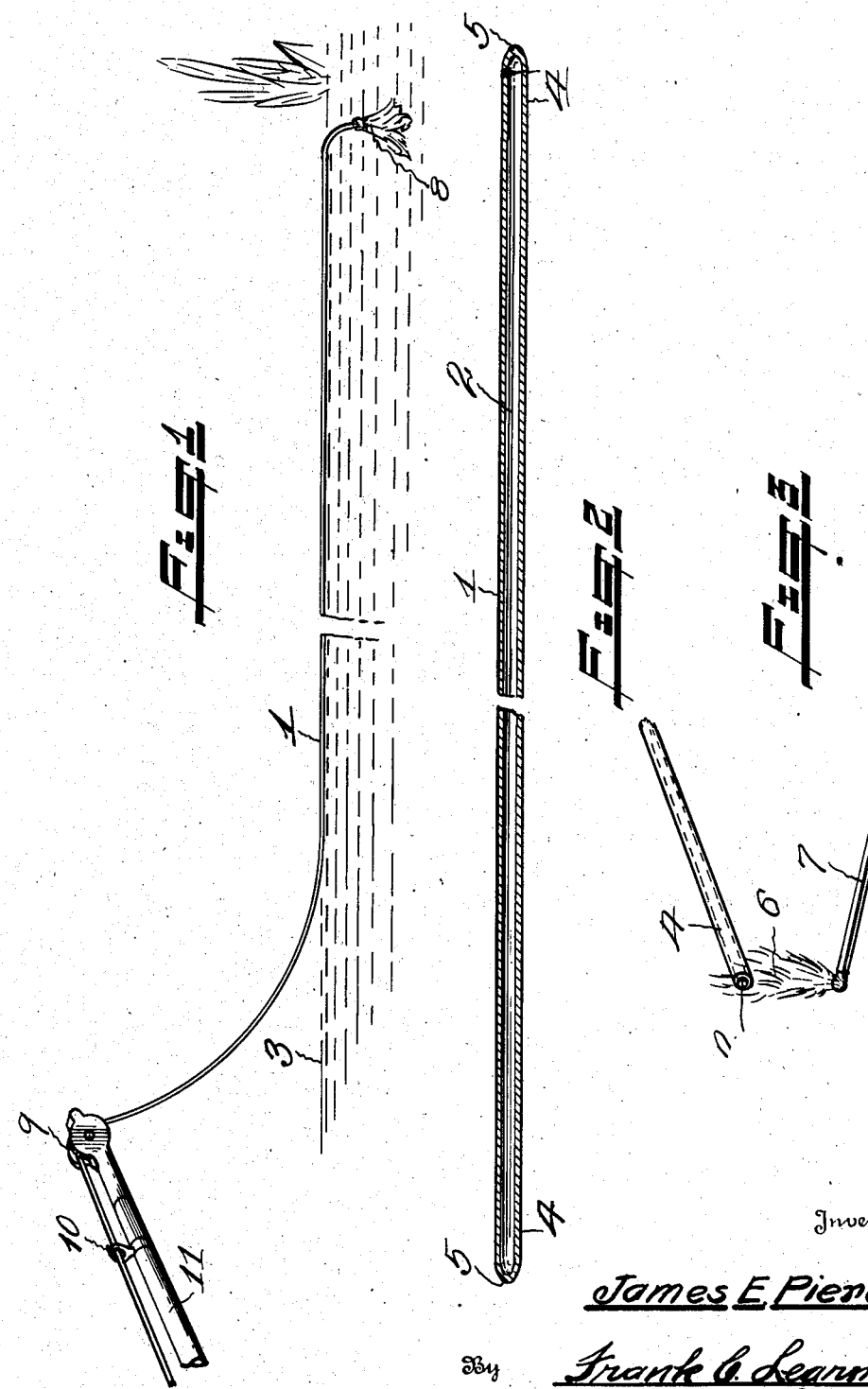
Inventor
James E. Pierce
By Frank C. Learman.
Attorney.

Patented Feb. 24, 1942

2,274,255

UNITED STATES PATENT OFFICE 2,274,255

FISHING LINE

James E. Pierce, Bay City, Mich., assignor to Pierce Plastics, Inc., Bay City, Mich., a corporation of Michigan Application August 12, 1940, Serial No. 352,226

1 Claim. (Cl. 43—27)

The invention relates to fishing lines, and has for its object to provide a device of this kind chambered and formed from a non-absorbent material and sufficiently buoyant to float on the surface of the water during a fishing or casting operation.

A further object is to form the fishing line from a thermo-plastic material, such as Nylon or Permalon, which has sufficient strength and flexibility for casting purposes and is also non-absorbent, thereby obviating the present difficulty and time involved in oiling, and afterwards wiping conventional silk lines.

A further object still is to provide a transparent or translucent floatable fishing line which will reduce shadows to a minimum when floating.

A still further object is to form the tubular line from a fuseable material, the ends of which can be easily sealed by the application of heat, and a smooth line which will easily reeve through fishing rod eyes during a casting or reeling-in operation.

With the above and other objects in view, the present invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Fig. 1 is a side elevation of the line, showing the same floating on the surface of the water and showing in perspective the tip end of a casting rod, Fig. 2 is a longitudinal sectional view through the line, showing the ends sealed, and, Fig. 3 is a perspective view of the line end, showing the method of sealing the same by the application of heat.

Referring to the drawing, the numeral 1 designates the line which is formed from a transparent non-absorbent material, for instance Nylon or "Permalon," or other similar thermoplastic material having a tensile strength not less than 20,000 pounds per square inch which is flexible and is formed with an air chamber 2 therein. The line may be formed by an extruding process and the chamber 2 is sufficiently large so the line, incident to its buoyancy, will float on the surface of the water 3, shown in Fig. 1. It has been found that a line so formed has sufficient strength for fishing purposes and sufficient flexibility for casting and reeling purposes. It has also been found that by forming the line from a transparent material shadows are reduced to a minimum, as the light rays will pass therethrough, and the line will not easily tangle or knot.

The ends 4 of the line are preferably sealed as at 5, and this sealing is accomplished by a fusing operation, shown in Fig. 3, through the medium of a flame 6 from a conventional form of match 7, therefore it will be seen that the fisherman can easily repair the line when necessary, either when wading in the stream or in any other desired place. The line is provided with a conventional form of fly 8 and the usual leader (not shown) is interposed between the end of the line and the fly, said line being threaded through the usual rod tip 9 and rod eyes 10 carried by the rod 11. The material is a hard smooth one, and yet is readily windable; consequently, the line will easily feed through the rod eyes 10 with the minimum amount of friction. At the present time silk lines are used, as well as enameled silk lines; however, these are expensive and require much care and have a relatively short life; whereas applicant's line has the strength and flexibility necessary for fishing purposes and incident to its chamber is lighter than water, therefore will float, and incident to its transparent character will reduce shadows to a minimum, which is an advantage in trout fishing. Being formed from a non-absorbent material, it will not be necessary to use a line dressing or to dry the line after fishing.

From the foregoing, it will be obvious that I have perfected a simple, practical, and economical, buoyant fishing line, which can be readily manufactured, which is non-absorbent, requiring no drying or wiping after use, and which can be easily and quickly sealed.

The invention, having been set forth, what is claimed as new and useful is:

A fishing line comprising a single tubular strand formed from a thermoplastic material having a tensile strength of at least 20,000 pounds per square inch, the specific gravity of the said tube and gas therein being less than that of water.

JAMES E. PIERCE.